United States Patent
O'Daniel

(10) Patent No.: US 6,676,221 B2
(45) Date of Patent: Jan. 13, 2004

(54) REAR ROLLER ASSEMBLY FOR A ROLLOFF HOIST

(75) Inventor: Harold W. O'Daniel, Mansfield, TX (US)

(73) Assignee: G&H Manufacturing, Ltd., Arlington, TX (US)

( * ) Notice: Subject to any disclaimer, the term of this patent is extended or adjusted under 35 U.S.C. 154(b) by 0 days.

(21) Appl. No.: 10/075,493

(22) Filed: Feb. 14, 2002

(65) Prior Publication Data
US 2003/0151296 A1 Aug. 14, 2003

(51) Int. Cl.⁷ .................................................. B60P 1/02
(52) U.S. Cl. ................. 298/17 SG; 298/22 R; 298/17 B; 298/12
(58) Field of Search .................... 298/17 SG, 17 B, 298/17 R, 22 R, 12; 414/471, 477, 482

(56) References Cited

U.S. PATENT DOCUMENTS

| | | | |
|---|---|---|---|
| 709,210 A | * 9/1902 | Eagen | 298/12 |
| 4,111,321 A | * 9/1978 | Webster | |
| 4,568,235 A | 2/1986 | Bills, Jr. | |
| 4,741,575 A | * 5/1988 | Sloan | 298/12 |
| 4,943,118 A | * 7/1990 | Davis | 298/12 |
| 5,069,507 A | 12/1991 | Lindsey | 298/11 |
| 5,183,371 A | * 2/1993 | O'Daniel | |
| 5,678,978 A | 10/1997 | Markham | |
| 6,318,808 B1 | * 11/2001 | Shayne | 298/178 |
| 6,547,335 B2 | * 4/2003 | McSweeney | 298/12 |

* cited by examiner

Primary Examiner—Stephen T. Gordon
(74) Attorney, Agent, or Firm—Charles D. Gunter, Jr.

(57) ABSTRACT

A refuse-hauling vehicle has a dumping bed for inclining containers carried on the bed. The bed pivots on a lateral axis forward of the rear end of the bed, the rear end of the bed moving downward as the forward end of the bed moves upward. A cylindrical roller is removably mounted to and between frame rails near the rear end of the bed, the roller being free to rotate on a lateral axis. The roller is installed by inserting a shaft in each end of the roller, the shafts being connected to mounting plates. Each plate is then attached to a bracket mounted on the frame rails. When installed, a lower portion of the outer surface of the roller is positioned to be the lowest point on the bed when the bed is in an inclined, or dumping, position. The roller contacts a support surface, preventing damage to the bed.

3 Claims, 3 Drawing Sheets

REAR ROLLER ASSEMBLY FOR A ROLLOFF HOIST

BACKGROUND OF THE INVENTION

1. Field of the Invention

This invention generally relates to an improved, vehicle-mounted rolloff hoist for loading, transporting, and unloading containers and more specifically relates to an improved roller assembly for preventing damage to the dumping bed of the rolloff hoist when the bed is in an inclined position.

2. Description of the Prior Art

A variety of vehicles are known in the prior art for loading, transporting, and unloading refuse and recycling type containers. One popular type of refuse-hauling vehicle which is used in a variety of industrial settings is the rolloff hoist. These vehicles are particularly well adapted for hauling refuse containers. These refuse and recycling containers, referred to collectively herein as "refuse" containers, are typically steel boxes with or without tops. The containers are sometimes lifted from, e.g., a site adjacent a retail store, for loading onto the bed of a vehicle for transport to a dump or recycling location. The bed may be a dumping bed capable of inclining the container to cause the contents of the container to slide out of the rear of the container at a dump. The bed also typically pivots to discharge the container itself when the container is returned to the refuse-collection point.

Typically, the pivot point of a dumping bed is forward of the rearward end of the bed. As the forward end of the bed moves upward for dumping, the rearward end moves downward into close proximity with the support surface. Gravity causes the contents of the container to move downward toward the surrounding support surface, and the contents slide out of a rear opening in the container.

As the contents may become lodged at the rear opening of the container, it is often necessary to move the vehicle forward while contents are being emptied. However, the rearward end of the bed may contact the support surface, damaging the bed. Also, as the container itself is being discharged, the rearward end of the bed typically contacts the surrounding support surface.

Therefore, there is a need for a dumping bed for a rolloff hoist having an improved means for preventing contact with a support surface while the bed is in an inclined position.

A need also exists for an improved rear roller assembly for a rolloff hoist which is easily replaced or removed for maintenance or repair.

A need also exists for such a rear roller assembly which is simple in design but rugged and reliable in operation.

SUMMARY OF THE INVENTION

A rolloff hoist has a dumping bed for inclining containers, for example, refuse containers, carried on the bed. The bed pivots on a lateral axis forward of the rear end of the bed, the rear end of the bed moving downward as the forward end of the bed moves upward. A cylindrical roller is removably mounted to and between frame rails near the rear end of the bed, the roller being free to rotate on a lateral axis. The roller is installed by inserting oppositely-arranged roller shafts in each end of the roller, the shafts being connected to mounting plates. Each plate is then attached to a bracket mounted on the frame rails. When installed, a lower portion of the outer surface of the roller is positioned to be the lowest point on the bed when the bed is in an inclined, or dumping, position. The roller contacts a surrounding support surface, preventing damage to the bed. The roller can be easily removed from the frame rails by removing the mounting plates.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
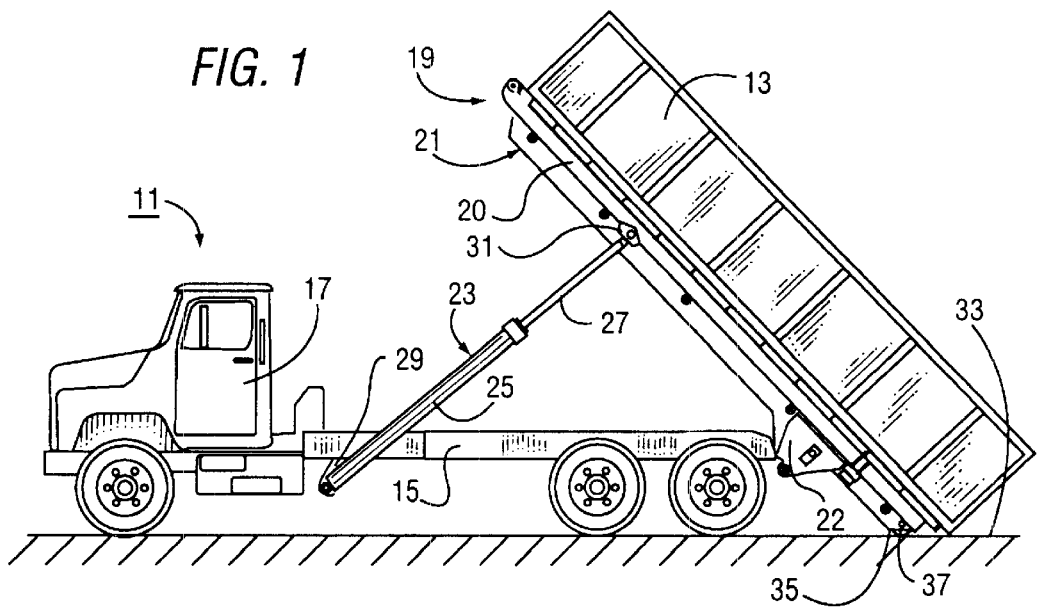
FIG. 1 is a profile view of a roll off hoist constructed in accordance with the present invention, the bed of the hoist being in an inclined position.

FIG. 1 depicts refuse-hauling vehicle 11, in this case a rolloff hoist, which is outfitted for use in hauling containers such as refuse container 13. Vehicle 11 has longitudinal frame rails 15 that extend for substantially the length of vehicle 11. A cab 17 is located at a forward portion of vehicle 11, cab 17 being mounted on frame rails 15. Bed 19 has a load platform 20 mounted on two frame rails 21, load platform 20 supporting container 13. Bed 19 is mounted to a rotatable pivot assembly 22 that allows for bed 19 to be rotated about a lateral axis to a dumping position, shown in FIG. 1. Bed 19 is moved by hydraulic actuator 23, comprising a cylinder 25 and piston 27 slidingly engaging the interior of cylinder 25. The lower end of cylinder 25 is rotatably attached to a plate 29 located on the underside of frame rails 15, and the upper end of piston 27 is rotatably attached to a lift point 31 on bed 19. As hydraulic pressure is directed into cylinder 25, piston 27 is forced outwards, extending the length of actuator 23 and raising bed 19.

Pivot assembly 22 is attached to bed 19 at a position forward of the rearward end of bed 19. Thus, when bed 19 is moved to the dumping position, the forward end of bed 19 moves upward, and the rearward end of bed 19 moves downward. This moves the rear of container 13 to be placed in close proximity to the surrounding support surface 33, allowing for the contents of container 13 to be emptied through an opening (not shown) at the rear of container 13.

Figure 2:
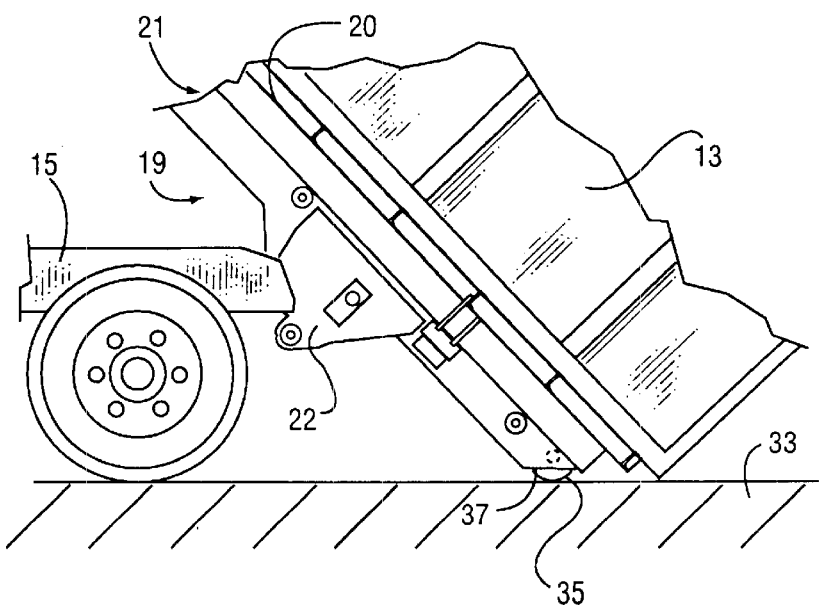
FIG. 2 is an enlarged profile view of the rear of the bed of FIG. 1.

To completely empty the contents of container 13, it is typically necessary to drive vehicle 11 forward, the contents spilling outward onto support surface 33. Roller 35 is rotatably mounted to a rear portion of frame rails 21 to prevent contact of bed 19 with support surface 33 and to partially support the weight of bed 19 and container 13. When in the dumping position, the rear end of bed 19 is near support surface 33, and roller 35 contacts support surface 33. Angled surfaces 37 are formed on the rearward edges of frame rails 21 to provide clearance for roller 35 to contact support surface 33. The position of roller 35 on bed 19 and in relation to support surface 33 when bed 19 is in the dumping position is shown in an enlarged view in FIG. 2, roller 35 in contact with support surface 33.

FIGS. 3 through 9 show the components that mount roller 35 (FIGS. 1 and 2) to an inner surface 39 of frame rail 21 on the passenger side of vehicle 11 (FIG. 1), the driver-side frame rail 21 having mirror-image components for mounting roller 35.

Figure 3:
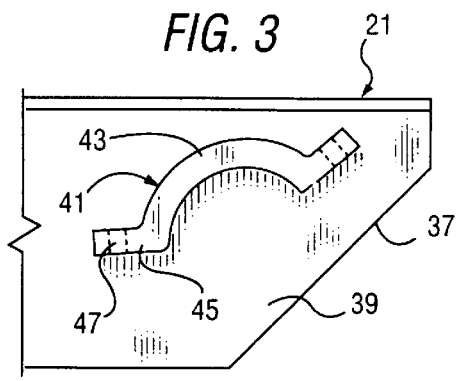
FIG. 3 is a profile view of a rear portion of a frame rail showing a mounting bracket installed in accordance with the present invention.

As shown in FIG. 3, a bracket 41 is attached to surface 39 of frame rail 21. Bracket 41 comprises a curved portion 43 and a flange 45 extending from each end of curved portion 43, each flange 45 having a hole 47 formed within it, the axes of holes 47 being normal to their respective flange. Curved portion 43 is a portion of a cylindrical wall comprising less than 180°. Bracket 41 is preferably welded to surface 39, as shown in FIG. 4, at weld 49 on curved portion 43 and at welds 51, 53 on flanges 45.

Figure 5:
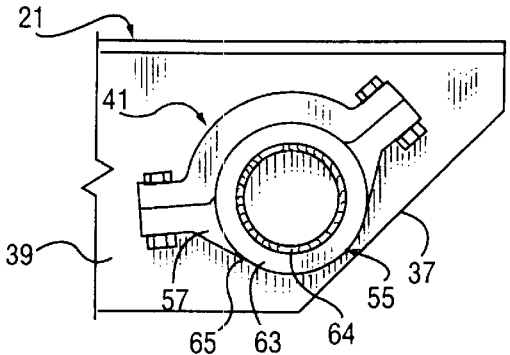
FIG. 5 is a profile view showing a pivot attached to the mounting plate of FIG. 4 in accordance with the present invention.
Figure 4:
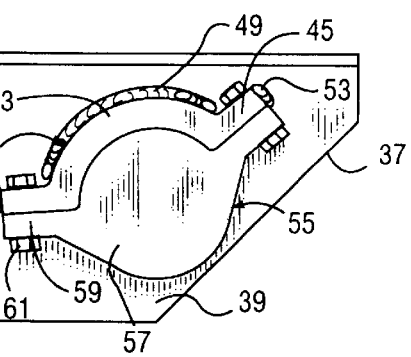
FIG. 4 is a profile view showing a mounting plate attached to the bracket of FIG. 3 in accordance with the present invention.
Figure 6:
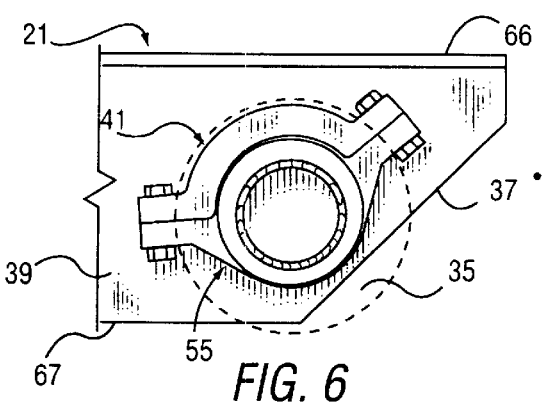
FIG. 6 is a profile view showing a roller installed on the pivot of FIG. 5 in accordance with the present invention, the roller being shown in phantom.
Figure 7:
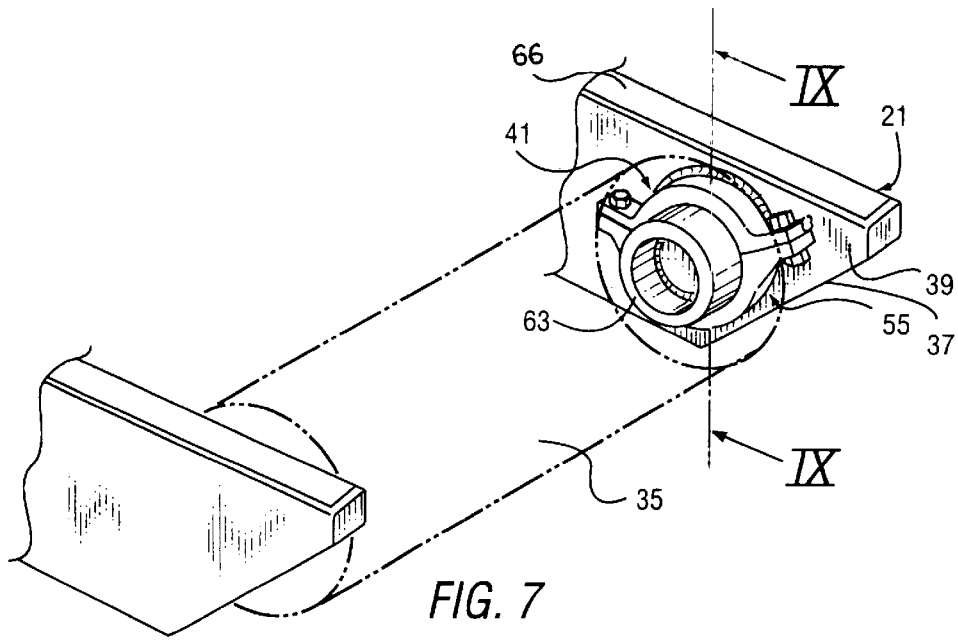
FIG. 7 is a perspective view showing the assembled mounting components and phantom roller of FIG. 6.

FIGS. 4 through 6 are profile views showing a roller mounting plate 55 attached to bracket 41 in an installed position. In FIG. 4, an outer edge of a central, arcuate portion 57 of plate 55 fits against the inner surface of curved portion 43 of bracket 41. Flanges 59 extend from opposite sides of the outer edge of arcuate portion 57. Like flanges 45 of bracket 41, a hole (not shown) is formed in each flange 59 that is normal to the outer portion of the flange 59. Fasteners 61 pass through the holes in flanges 45, 59 to retain plate 55 in abutment with bracket 41.

FIG. 5 depicts plate 55 with a cylindrical roller shaft 63 attached to arcuate portion 57. Shaft 63 has an outer bearing surface 65 and is oriented so that its axis is generally horizontal and positioned to be aligned with the center of arcuate portion 57. Shaft 63 is preferably welded to plate 55 at weld 64. Shaft 63 is rotatably inserted into roller 35 to retain roller 35 in a position relative to frame rail 21, roller 35 being shown in phantom in FIG. 6. The outer circumference of roller 35 is positioned below upper surface 66 of frame rail 21 and to extend outside of the plane containing surface 37 of frame rail 21. The outer circumference of roller 35 also extends slightly below lower surface 67 of frame rail 21. The installed roller 35 and retaining assembly is shown in a perspective vie in FIG. 7.

The actual order of assembly is different from the order shown in the figures, which are for illustration purposes only. For example, oppositely-extending roller shafts 63 are attached to mounting plates 55 and roller 35 is installed on shafts 63 prior to plates 55 being attached to brackets 41.

Figure 8:
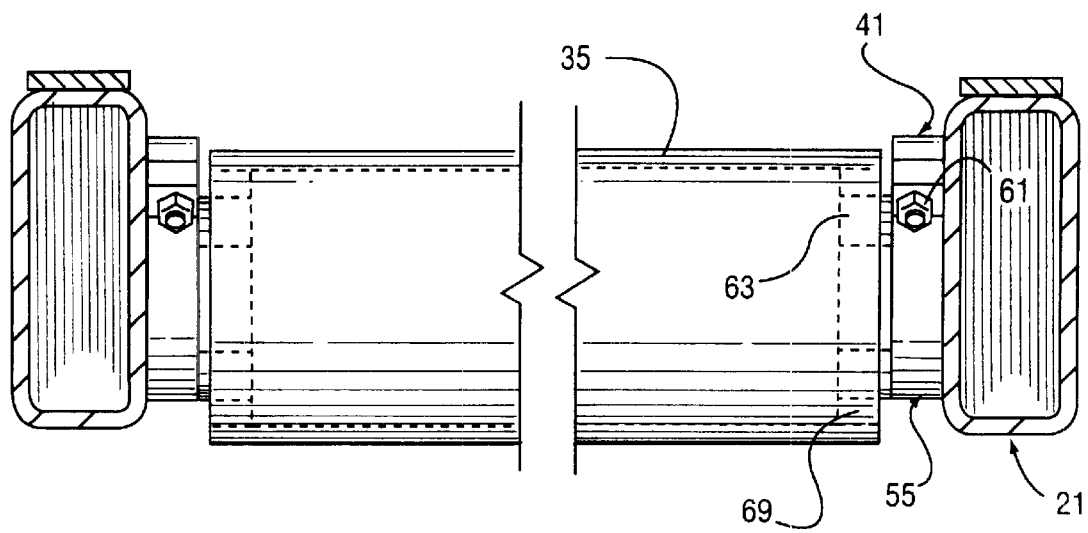
FIG. 8 is a rear view of the roller and mounting components of FIG. 6.
Figure 9:
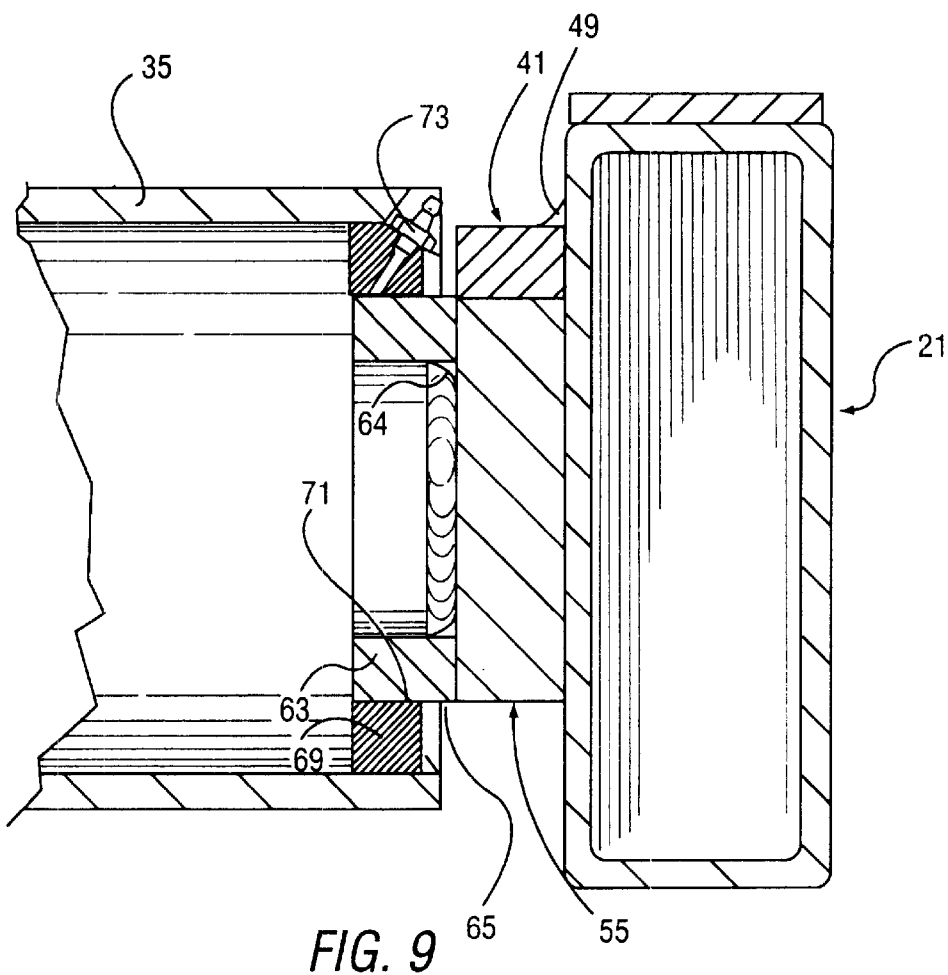
FIG. 9 is an enlarged cross-sectional view of an end of the roller of FIG. 6.

FIGS. 8 and 9 are rear views showing details of roller 35, which is shown installed on shafts 63. Each mounting plate 55 is fastened to a bracket 41 with fasteners 61. A metal insert 69 is installed within each lateral end of roller 35, surface 71 of insert 69 bearing against surface 65 of shaft 63 to locate roller 35 relative to shaft 63. A grease zerk 73 is installed in insert 69 to allow for a lubricant to be injected for lubricating the interface of surfaces 65, 71.

Referring to the figures, to install roller 35 on frame rails 21, bracket 41 is welded to inner surfaces 39 of frame rails 21. Shafts 63 are welded to plates 55, and inserts 69 are installed in roller 35. Plates 55 are placed at the ends of roller 35, each shaft 63 being inserted into an insert 69. Plates 55 are then moved into abutment with brackets 41 and attached to brackets 41 with fasteners 61, roller 35 being retained on shafts 63 and between plates 55. After roller 35 is installed, lubricant is inserted through grease zerk 73 to allow for reduced friction when roller 35 is rotate on shafts 63.

In operation, vehicle 11 is positioned in the desired location, and bed 19 is raised using hydraulic actuators 23 to incline container 13. Roller 35 prevents frame rails 21 from contacting support surface 33. As the content of container 13 are emptied through an opening in the rear of container 13, vehicle 11 is moved forward, roller 35 rolling against support surface. After container 13 is emptied, bed 19 is returned to its lower position.

While the invention has been shown in only one of its forms, it is not thus limited but is susceptible to various changes and modifications without departing from the spirit thereof.

I claim:

1. A rolloff hoist having a dumping bed for transporting a container, the rolloff hoist comprising:

a load platform pivotally mounted to the rolloff hoist, the platform pivoting about a lateral axis located forward of the rear end of the platform, the load platform pivoting between a transporting position and a dumping position;

a cylindrical roller rotatably mounted in a lateral orientation to a pair of vertical surfaces near a rear portion of the load platform, the roller being mounted between the vertical surfaces so that a portion of an outer surface of the roller is lower than a remainder of the load platform when the load platform is moved to the dumping position;

a bracket mounted to each vertical surface; and a mounting plate removably attached to each bracket, each mounting plate having a shaft extending into an end of the roller for retaining roller in a position relative to the vertical surfaces.

2. rolloff hoist of claim 1, wherein:

the vertical surfaces are inner surfaces of longitudinal frame rails attached to a lower surface the load platform.

3. The rolloff hoist of claim 2 wherein:

rear edges of the frame rails are formed to provide clearance for the roller.

* * * * *